United States Patent
Chu et al.

(10) Patent No.: US 6,674,642 B1
(45) Date of Patent: Jan. 6, 2004

(54) LIQUID-TO-AIR COOLING SYSTEM FOR PORTABLE ELECTRONIC AND COMPUTER DEVICES

(75) Inventors: Richard C. Chu, Hopewell Junction, NY (US); Michael J. Ellsworth, Jr., Lagrangeville, NY (US); Robert E. Simons, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/183,671

(22) Filed: Jun. 27, 2002

(51) Int. Cl.$^7$ ................................................ G06F 1/20
(52) U.S. Cl. ...................... 361/687; 361/715; 165/80.4; 62/259.2
(58) Field of Search ................................ 361/687, 699, 361/700–704, 707, 715; 165/80.4, 104.33, 170; 62/259.2, 59; 364/708.1

(56) References Cited

U.S. PATENT DOCUMENTS

| | | | |
|---|---|---|---|
| 5,634,351 A | 6/1997 | Larson et al. ............... 62/259.2 |
| 5,661,637 A | 8/1997 | Villaume ..................... 361/687 |
| 5,757,615 A | 5/1998 | Donahoe et al. ............ 361/687 |
| 5,847,925 A | 12/1998 | Progl et al. ................. 361/687 |
| 5,896,922 A | 4/1999 | Chrysler et al. ............. 165/165 |
| 5,934,364 A | 8/1999 | Chrysler et al. ............. 165/170 |
| 5,954,127 A | 9/1999 | Chrysler et al. ............. 165/170 |
| 5,966,286 A | 10/1999 | O'Connor et al. ........... 361/699 |
| 5,970,731 A | 10/1999 | Hare et al. .................. 62/196.4 |
| 6,031,716 A | 2/2000 | Cipolla et al. ............... 361/687 |
| 6,034,872 A | 3/2000 | Chrysler et al. ............. 361/699 |
| 6,035,655 A | 3/2000 | Hare et al. .................. 62/259.2 |
| 6,055,156 A | 4/2000 | von Gutfeld ................. 361/690 |
| 6,115,251 A | 9/2000 | Patel et al. .................. 361/687 |
| 6,122,166 A | 9/2000 | Mochizuki et al. .......... 361/687 |
| 6,157,537 A | 12/2000 | Cheng ......................... 361/699 |
| 6,173,759 B1 | 1/2001 | Galyon et al. ............... 165/80.4 |
| 6,213,194 B1 | 4/2001 | Chrysler et al. ............. 165/80.3 |
| 6,411,506 B1 * | 6/2002 | Hipp et al. ................... 361/686 |
| 6,570,755 B2 * | 5/2003 | Curlee et al. ................ 361/683 |
| 6,587,336 B2 * | 7/2003 | Chu et al. .................... 361/687 |

FOREIGN PATENT DOCUMENTS

| | | | |
|---|---|---|---|
| JP | 6266474 | 9/1994 | ............. G06F/1/20 |
| JP | 2000261173 | 9/2000 | ............. H05K/7/20 |

OTHER PUBLICATIONS

Chu et al., pending U.S. patent application Ser. No. 09/726,909, filed Nov. 30, 2000, entitled "Electronic Module With Integrated Programmable Thermoelectric Cooling Assembly and Method of Fabrication".

(List continued on next page.)

*Primary Examiner*—Hung Van Duong
(74) *Attorney, Agent, or Firm*—Andrew J. Wojnicki, Jr., Esq.; Kevin P. Radigan, Esq.; Heslin Rothenberg Farley & Mesiti P.C.

(57) ABSTRACT

A cooling system and method of fabrication are provided for cooling a heat-generating electronic element within a portable computer. The cooling system includes a cold plate assembly coupled to a heat-generating electronic element, and a heat exchange assembly disposed within the cover of the portable computer. The heat exchange assembly includes a hollow channel for carrying coolant, as well as a thermally conductive plate and air-cooled fins. The hollow channel is coupled to one main surface of the plate, while the air-cooled fins are coupled to an opposite main surface of the plate. A conduit carries coolant between the cold plate assembly and the hollow channel of the heat exchange assembly, and a circulation pump circulates coolant through the conduit between the cold plate assembly and the heat exchange assembly in a manner to remove heat from the heat-generating electronic component.

20 Claims, 4 Drawing Sheets

OTHER PUBLICATIONS

Chu et al., pending U.S. patent application Ser. No. 09/726,900, filed Nov. 30, 2000, entitled "Electronic Module With Integrated Thermoelectric Cooling Assembly".

Chu et al., pending U.S. patent applications Ser. No. 09/893,135 filed Jun. 27, 2001, entitled "Cooling System for Portable Electronic and Computer Devices".

"Hitachi develops water–cooling system for notebook PCs", Kuriko Miyake, Feb. 27, 2002, Tokyo, Japan, http://www.industrystandard.com.au/idg2...., Jun. 4, 2002, 2 pgs.

"Hitachi's Water–Cooled Notebook PC Runs Quietly Without Fan", Hitachi Chemical Diagnostics, Inc., http://www.h-cdiagnostics.com/hitachinews, Jun. 4, 2002, 1 pg.

* cited by examiner

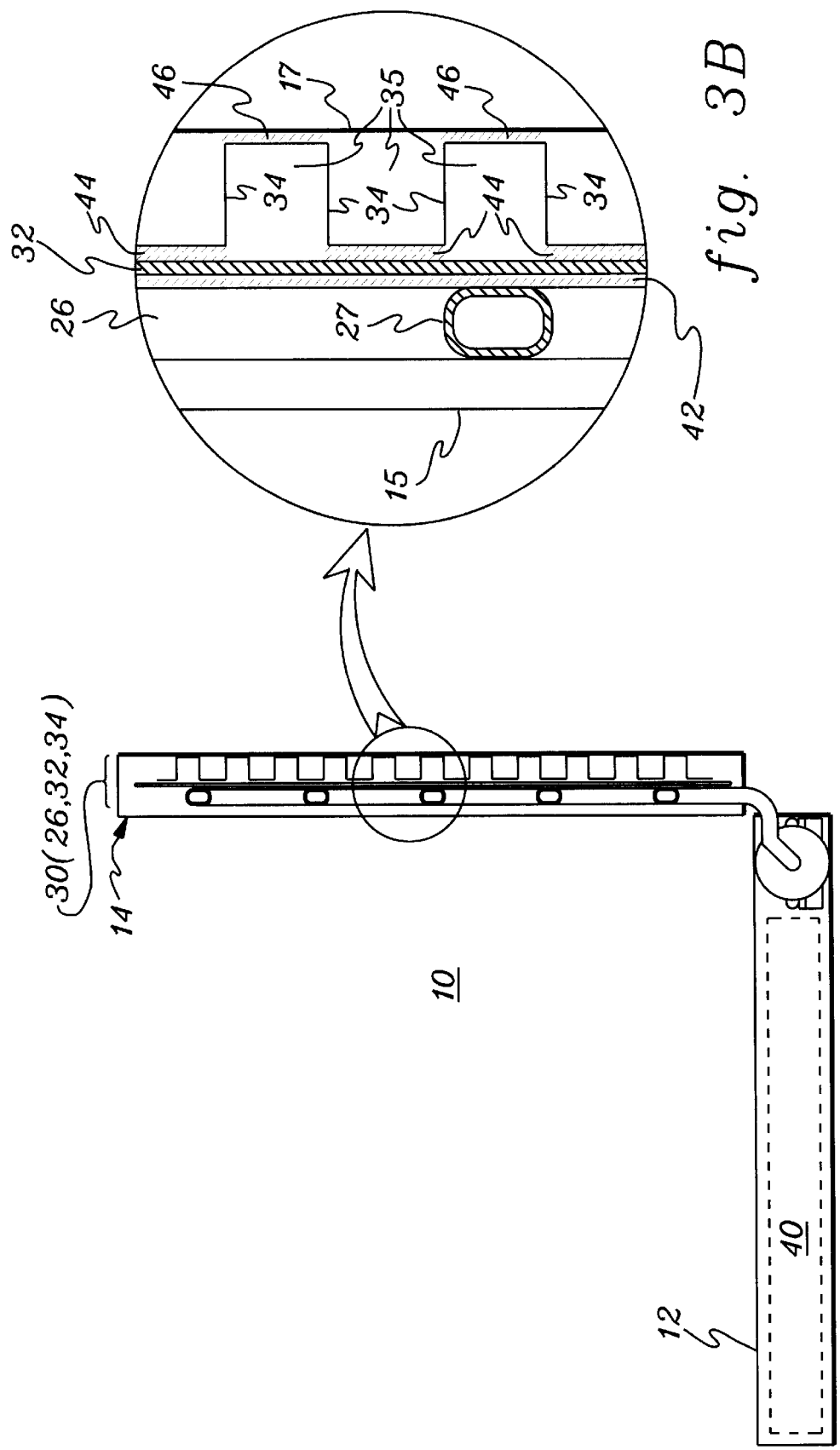

LIQUID-TO-AIR COOLING SYSTEM FOR PORTABLE ELECTRONIC AND COMPUTER DEVICES

CROSS-REFERENCE TO RELATED APPLICATION

This application contains subject matter which is related to the subject matter of the following application, which is assigned to the same assignee as this application. The below-listed application is hereby incorporated herein by reference in its entirety:

"Cooling System for Portable Electronic and Computer Devices", by Chu et al., U.S. Ser. No. 09/893,135, filed Jun. 27, 2001.

TECHNICAL FIELD

The present invention relates to a cooling system and method for cooling high heat dissipating components within electronic and computer system enclosures. More particularly, this invention relates to a cooling system for removing heat from high heat dissipating components located within portable electronic and computer devices having a main body portion and a cover connected in an openable manner to the main body portion.

BACKGROUND OF THE INVENTION

High heat dissipating components located within small confines of certain consumer electronic devices may create hot spots at certain locations along the external casing of the device. These hot spots may be uncomfortable to the touch, and in some cases may cause injury. Therefore, it is desirable to dissipate heat away from the high heat generating components located within the enclosure of small form factor devices in such a way as to keep the internal components within their specified operating temperature range and to preclude the creation of hot spots along the exterior of the enclosure, and particularly along the bottom of the enclosure.

A number of prior techniques have been used to remove heat from heat generating components located within the confines of a computer system enclosure. For example, cooling integrated circuit devices within notebook computers has evolved from the simple attachment of a finned heat sink to the top surface of the device, to the development of finned heat sinks having integral fans. More recent developments have included the use of forced cooling air to cool one side of a heat spreading plate having an integrated circuit attached to the other side. Although these heat transfer methods have proved sufficient in the past, they do not provide the heat removal capacity and/or efficiency needed to cool current and future high-performance microprocessors in portable general-purpose computers and other thin profile electronic devices.

What is needed then is an apparatus and method which solves the aforementioned problems associated with cooling internal electronic circuits located within portable consumer electronic and computer devices. Particularly, what is needed is a highly efficient cooling system that is conformable to the size and power consumption restrictions imposed by small form factor and thin profile electronic devices, such as, for example, notebook computers.

SUMMARY OF THE INVENTION

Briefly described, provided herein in one aspect is a cooling system for a portable electronic device, such as a portable computer, which includes a computer body having a heat generating electronic element therein, and a display section having a screen connected in an openable manner to the computer body. The cooling system includes a cold plate assembly and a heat exchange assembly. The cold plate assembly has a surface coupled to the heat generating electronic element for extraction of heat generated thereby, and the heat exchange assembly is disposed within the openable display section of the portable computer. The heat exchange assembly includes a hollow channel for carrying coolant. A conduit is provided for carrying coolant between the cold plate assembly and the hollow channel of the heat exchange structure; and a circulation pump is also provided for circulating coolant therethrough. Specifically, the circulation pump circulates coolant between the cold plate assembly and the heat exchange assembly in a manner so as to cause heat from the heat generating electronic element to be transferred to the coolant, and carried by the coolant to the heat exchange assembly for dissipation therefrom. The heat exchange assembly further includes a thermally conductive plate and air-cooled fins. The hollow channel is coupled to one main surface of the thermally conductive plate for facilitating the transfer of heat from coolant within the channel to the plate, and the air-cooled fins are coupled to an opposite main surface of the thermally conductive plate for facilitating the dissipation of heat transferred to the thermally conductive plate.

In another aspect, an electronic apparatus is provided which includes a base housing having a heat-generating component disposed therein, and a lid housing supported on the base housing for movement relative thereto between open and closed positions. A cooling system is also provided for dissipating operating heat generated by the heat-generating component. The cooling system includes a cold plate assembly having a surface coupled to the heat-generating component, and a heat exchange assembly disposed within the lid housing. The heat exchange assembly includes a hollow channel for carrying coolant. A conduit carries coolant between the cold plate assembly and the hollow channel within the heat exchange assembly. A circulation pump is provided for circulating coolant through the conduit between the cold plate assembly and the heat exchange assembly in a manner to cause heat from the heat-generating component to be transferred to the coolant, and carried by the coolant to the heat exchange assembly for dissipation therefrom. The heat exchange assembly further includes a thermally conductive plate and air-cooled fins. The hollow channel is coupled to one main surface of the thermally conductive plate for facilitating the transfer of heat from coolant within the hollow channel to the thermally conductive plate, and the air-cooled fins are coupled to an opposite main surface of the thermally conductive plate for facilitating the dissipation of heat transferred to the thermally conductive plate from coolant within the hollow channel.

In a further aspect, a method of fabricating a cooling system is provided for a portable computer which includes a computer body having a heat-generating electronic element, and a display section with a screen connected in an openable manner to the computer body. The method includes: coupling a cold plate assembly to the heat-generating electronic element; disposing a heat exchange assembly within the openable display section of the portable computer, the heat exchange assembly including a hollow channel for carrying coolant; providing a conduit for carrying coolant between the cold plate assembly and the hollow channel within the heat exchange assembly; disposing a circulation pump in the computer body for circulating coolant through the conduit between the cold plate assembly and the heat exchange assembly in a manner causing heat from the heat-generating electronic element to be transferred to the coolant, and carried by the coolant to the heat exchange assembly for dissipation therefrom; and providing the heat exchange assembly with a thermally conductive plate and air cooled fins, the hollow channel being coupled to the thermally conductive plate for facilitating the transfer of heat from coolant within the hollow channel to the thermally conductive plate, and the air-cooled fins being coupled to the thermally conductive plate for facilitating the dissipation of heat transferred to the thermally conductive plate from coolant within the hollow channel.

Advantageously, provided herein is a liquid-to-air cooling system which significantly increases the cooling capacity of a portable computer. This allows a heat-generating component, such as a microprocessor disposed within the body of the portable computer, to either run at a faster rate, or for a given component, allows the portable computer environment to run cooler, thereby extending reliability. In one embodiment, a water-to-air cooling system is described which employs forced water flow to provide a significantly lower thermal resistance path from, for example, a processor module in the body of a portable computer to a heat exchange assembly disposed within the openable cover. A folded fin structure can be employed within the heat exchange assembly to provide increased surface area for heat transfer. The higher heat transfer coefficient provided by forcing air flow through the air-cooled fins results in a significantly lower thermal resistance path for heat within coolant passing through the heat exchange assembly to ambient air. Further, an auxiliary thermal path is created in one aspect from the heat exchange assembly directly to the back wall of the cover via thermal conduction. Thus, in the event that the air moving device malfunctions, the portable computer could still operate at reduced power via natural convection and radiation off the cover. Still further, by dissipating heat away from the high heat-generating component(s) disposed within the body of the portable computer, the components are more readily maintained within their specified operating temperature range, and the creation of hot spots along the exterior of the portable computer is precluded.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3A is a side, cross-sectional illustration of the portable computer of FIGS. 1 & 2 identifying a portion thereof for enlargement as FIG. 3B, in accordance with an aspect of the present invention;

FIG. 3B is an enlarged cross-sectional view of the heat exchange assembly of FIG. 3A, in accordance with an aspect of the present invention;

BEST MODE FOR CARRYING OUT THE INVENTION

Generally stated, a liquid-to-air cooling system and method for removing heat from a heat generating component located within a thin-profile consumer electronic or computer system enclosure are described herein. In the following description, specific details are set forth such as material types, processing steps, etc., in order to provide a thorough understanding of the present invention. However, it will be obvious to one of ordinary skill in the art that the invention may be practiced without these specific details. In other instances, well known elements or processing techniques have not been shown in particular detail in order to avoid unnecessarily obscuring the present invention. In order to illustrate the need for cooling systems that are capable of being integrated within an enclosure having limited available space, this discussion focuses principally on removing heat from integrated circuits housed within portable computers, such as notebook and laptop computers. It will be recognized, however, that such focus is for descriptive purposes only and that the cooling system and method of the present invention are applicable to other thin profile electronic devices, which are collectively referred to herein as "portable computers".

Improving computer performance invariably translates into increasing power dissipation. Nowhere does this pose a greater challenge than in a portable computer, such as a laptop computer. Present day laptops have their heat removed via natural convection and radiation from the outer casing. Designs have been proposed to improve laptop cooling by better spreading heat within the main chassis or processor compartment. In addition, schemes have been suggested to provide a means of transporting heat into the notebook cover housing the liquid crystal display. While these methods may help the cooling situation, heat rejection from the cover is still limited by the poor heat transfer coefficients attained with natural convection or radiation. This situation is significantly improved herein by implementing heat removal by forced convection. Specifically, described hereinbelow is a technique for utilizing forced convection to transport heat both internally and externally of the portable computer.

Figure 1:
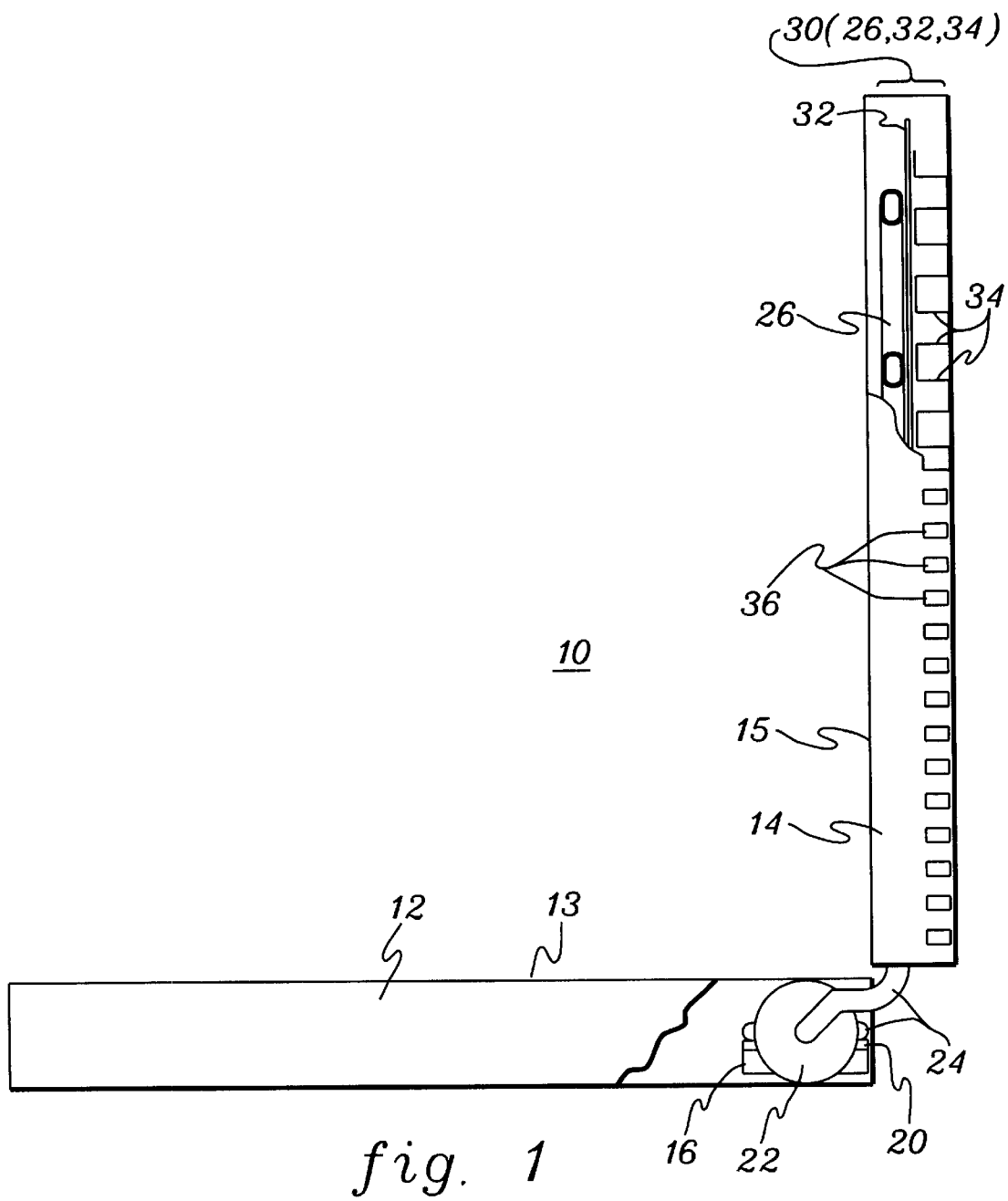
FIG. 1 is a side elevational illustration of a portable computer showing in partial breakaway one embodiment of a cooling system disposed therein, in accordance with an aspect of the present invention.

Advantageously, heat is more effectively transferred to an openable cover of a portable computer in accordance with the present invention by incorporating an active liquid cooling loop into the electronics apparatus, and by coupling the liquid cooling loop to a heat exchange assembly disposed within the openable cover. FIG. 1 depicts a portable computer, generally denoted 10, having one embodiment of a liquid-to-air cooling system in accordance with an aspect of the present invention. Portable computer 10 includes a computer body 12 having a keyboard and/or keypad 13 on an upper surface thereof, and a cover 14 which is connected in an openable manner to the computer body. For example, in one embodiment, one or more hinges (not shown) could be provided so that cover 14 pivots between an open and closed position relative to computer body 12. Cover 14 includes a user viewable screen 15.

One or more heat-generating electronic elements 16 are disposed within computer body 12 from which heat is to be removed. In this embodiment, heat produced by element 16 is transferred to an active liquid cooling loop via a low profile cold plate 20. Cold plate assemblies for cooling heat-generating components are described in various issued United States Letters Patents, including U.S. Pat. Nos. 6,213,194; 6,035,655; 6,034,872; 5,970,731; 5,954,127; 5,934,364; 5,896,922. In one embodiment, the low profile cold plate essentially comprises a continuous tubular liquid passage attached to the processor module by means of a mechanical clamp or thermal epoxy.

Liquid coolant, water in one example, is pumped via a miniature circulation pump 22 (such as a centrifugal pump) through flexible plastic tubing 24 into a heat exchange assembly 30 disposed within cover 14 of portable computer 10. Tubing 24 is preferably continuous between the computer body and the cover to minimize heat transfer interferences. Within the heat transfer assembly, the heated liquid undergoes cooling as heat is transferred to the ambient environment, as explained below.

The heat exchange assembly 30 includes, in one embodiment, a continuous tube or channel 26 in fluid communication with tubing 24. The continuous channel is coupled to one main surface of a thermal spreader or thermally conductive plate 32. Air-cooled fins 34 are coupled to an opposite main surface of thermally conductive plate 32. Operationally, heat from coolant within channel 26 is transferred to the thermally conductive plate, and from the thermally conductive plate to the air-cooled fins for dissipation to the ambient environment, for example, through air outlet vents 36 in cover 14. In one embodiment, each air outlet vent 36 could align to a respective air passage or channel defined by air-cooled fins 34.

Figure 2:
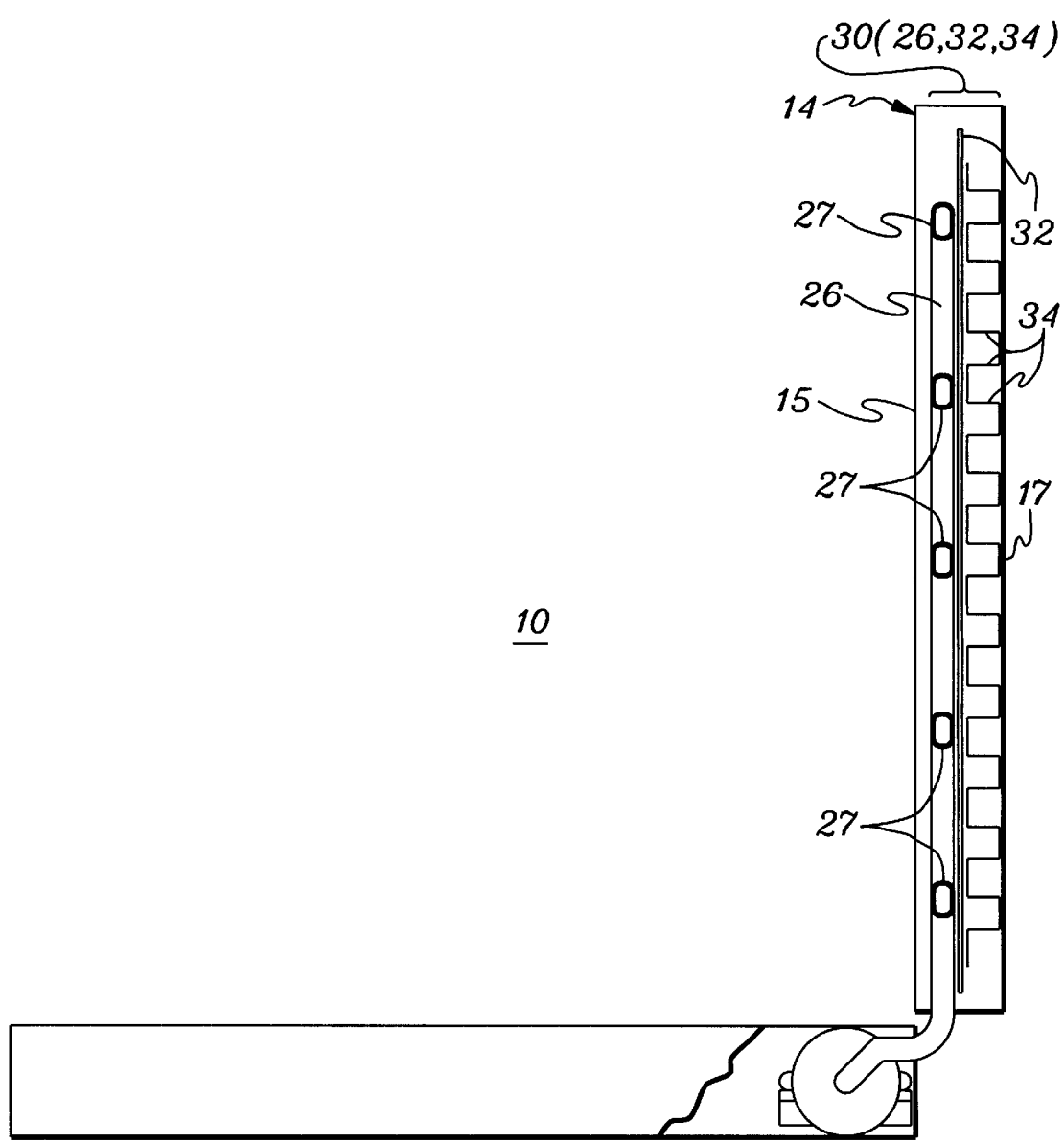
FIG. 2 is a side elevational illustration of the portable computer of FIG. 1 showing in partial breakaway the cooling system thereof in greater detail, in accordance with an aspect of the present invention.

The heat exchange assembly 30 within cover 14 of portable computer 10 is shown in further detail in FIG. 2. The heat exchange assembly 30 resides in the space between, for example, the liquid crystal display panel 15 and an outer, back wall 17 of cover 14. The cooling channel 26 may comprise a continuous serpentine configuration (see FIG. 4A) wherein multiple horizontally disposed channel sections 27 are provided coupled to the thermally conductive plate 32 to provide reasonably uniform heat transfer to the thermally conductive plate, and hence to the air-cooled fins 34.

FIGS. 3A & 3B depict further details of the portable computer 10 embodiment depicted in FIGS. 1 & 2. In FIG. 3A, body 12 is shown to include other electronics 40, such as a hard drive, CD rom drive, etc., while a more detailed embodiment of heat exchange assembly 30 within cover 14 is depicted in FIG. 3B.

As shown in FIG. 3B, cooling channel 26, in fluid communication with tubing 24 (FIG. 1) is spaced from the user viewable display screen 15. Cooling channel 26 may be oval in cross-section as shown by the horizontally extending portion 27. During fabrication, cooling channel 26 may initially have a circular cross-section, and then undergo compression to obtain the depicted structure. By compressing the cooling channel, a lower profile is obtained, as well as an increased contact area with the thermally conductive plate 32.

Depending upon the construction of thermally conductive plate 32, the cooling channel 26 may be soldered or epoxied 42 to the plate 32. For example, coil 26 may be soldered to the thermally conductive plate 32 if the plate is made of copper, or may be attached with a thermal epoxy if plate 32 is made of aluminum.

Attached to the opposite main surface of thermally conductive plate 32 is, in one embodiment, a folded fin structure 34 which has multiple folded fin surfaces disposed in opposing relation to the main surface of plate 32. The folded fin structure, which may be made of a continuous sheet of thin corrugated copper or aluminum, defines air channels 35 and has folded fin surfaces adjacent to the thermally conductive plate for attaching 44 to the plate by means of solder if the plate is made of copper, or a thermal epoxy if the plate is made of aluminum. The opposite folded fin surfaces of the folded fin structure may be attached 46 to the inside of back wall 17 of cover 14, for example, by means of a thermal epoxy.

Those skilled in the art should note from the above discussion of FIG. 3B, that provided herein is, in one aspect, an auxiliary cooling path defined by coupling the air-cooled fins to the thermally conductive plate and to the back wall of the cover. Thus, a direct path is provided for removal of heat by natural convection and radiation off the back wall of the cover. As a further enhancement, additional heat control could be provided by attaching a thermal couple to the thermally conductive plate. If the temperature of the plate increased to a certain level, then a command could be provided to slow the heat generating component (e.g., processor) so that the component is not dissipating as much heat.

Figure 4B:
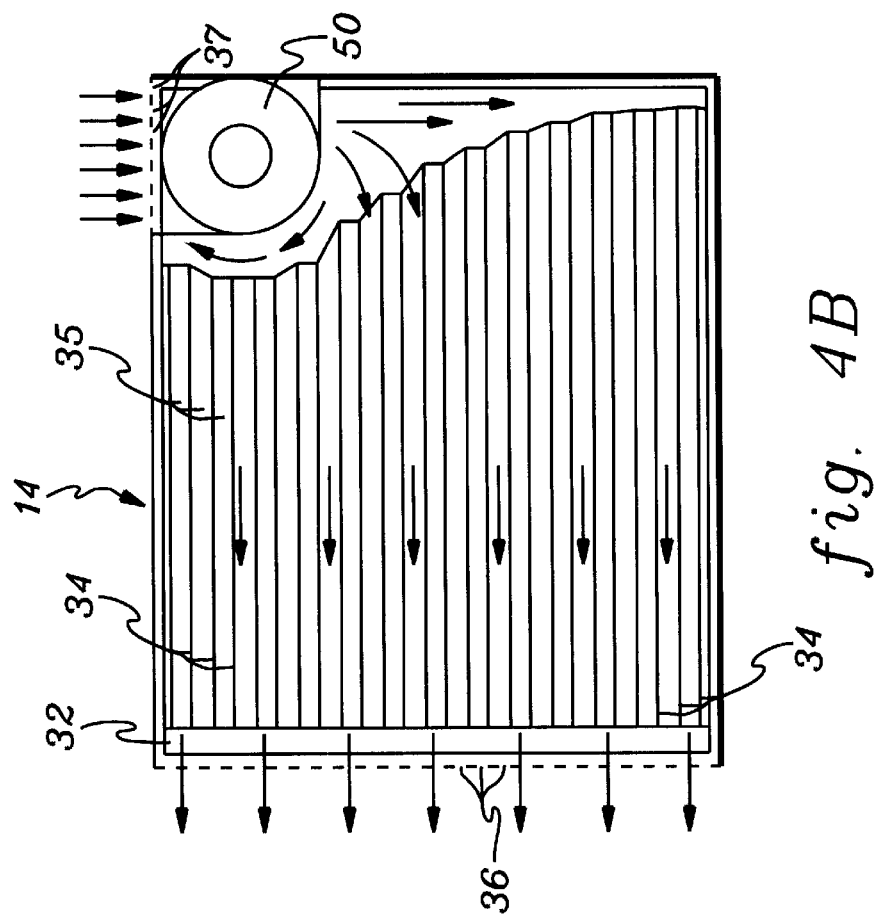
FIG. 4B is a back plan view of the heat exchange assembly of FIGS. 1–3B showing air-cooled fins and an air moving device coupled to an opposite main surface of the thermally conductive plate, in accordance with an aspect of the present invention.
Figure 4A:
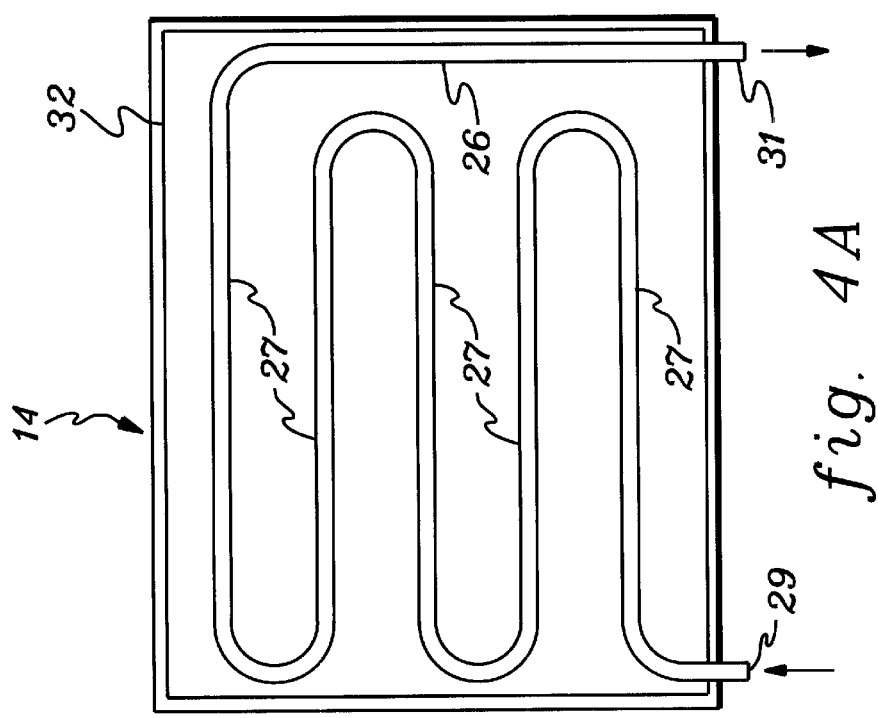
FIG. 4A is a front plan view of the heat exchange assembly of FIGS. 1–3B showing a coolant carrying channel of the assembly coupled to one main surface of a thermally conductive plate, in accordance with an aspect of the present invention.

FIGS. 4A & 4B depict front and back plan views of the heat exchange assembly disposed within cover 14. In FIG. 4A, one embodiment of cooling channel 26 is shown overlying a main surface of thermally conductive plate 32. As noted above, cooling channel 26 may include various configurations, including a serpentine configuration having multiple horizontally extending channel portions 27. Cooling channel 26 is in fluid communication with tubing 24 (FIG. 1), and receives coolant, such as water, through an inlet 29 and returns the coolant to the base of the portable computer through an outlet 31.

FIG. 4B depicts one embodiment of the folded fin structure 34 coupled to the back side of thermally conductive plate 32, which again is disposed within the openable cover 14 of the portable computer. Cover 14 is shown to include air outlet vents 36 on a side surface thereof, and air inlet vents 37 along a top edge. Mounted in one end of cover 14 is a low profile pancake fan 50 which actively forces air through the air cooled channels 35 defined by the air-cooled fins 34. The pancake fan 50 draws in room air and delivers it through the parallel flow channels 35 to exit out air vents 36 formed in the side of cover 14. In this embodiment, a converging plenum is formed as shown within the cover to more evenly distribute the air provided by pancake fan 50 to channels 35.

Various alternative air-cooled fin embodiments could be provided as part of a heat exchange assembly in accordance with the principles of the present invention. For example, if air fin cooling is to be employed without the use of an active air moving device, then it may be desirable to orient the fins vertically, wherein air would move through the cover by natural convection with inlet and outlet vents being provided in the bottom edge and top edge, respectively, of the cover.

To summarize, those skilled in the art should note from the above discussion that provided herein, in one aspect, is a water-to-air cooling system which employs forced water flow to provide a significantly lower thermal resistance path from a processor module to a heat exchange assembly disposed within the cover. The folded fin structure of the heat exchange assembly further provides increased surface area for heat transfer, and the higher heat transfer coefficients provided by forced air flow through the air-cooled fins result in a significantly lower thermal resistance path from the thermally conductive plate to ambient air. Further, as noted above, an auxiliary thermal path is created through the thermally conductive fins from the plate of the heat exchange assembly to the back wall of the cover via thermal conduction. Thus, in the event that the air moving device malfunctions, the portable computer could still operate at reduced power via natural convection and radiation off the cover. Further, it should be noted that various types of liquid coolant could be employed within the cooling system. For example, the coolant could comprise water, a water and alcohol mixture, or a water and glycol mixture. Those skilled in the art will realize that other coolant mixtures could also be employed.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A cooling system for a portable computer which includes a computer body having a heat generating electronic element therein, and a display section having a screen connected in an openable manner to the computer body, the cooling system comprising:
   a cold plate assembly having a surface coupled to the heat generating electronic element for extraction of heat generated thereby;
   a heat exchange assembly disposed within the openable display section of the portable computer, the heat exchange assembly including a hollow channel for carrying coolant;
   a conduit for carrying coolant between the cold plate assembly and the hollow channel of the heat exchange assembly;
   a circulation pump for circulating coolant through the conduit between the cold plate assembly and the heat exchange assembly in a manner causing heat from the heat generating electronic element to be transferred to the coolant, and carried by the coolant to the heat exchange assembly for dissipation therefrom; and
   wherein the heat exchange assembly includes a thermally conductive plate and air-cooled fins, the hollow channel being coupled to the thermally conductive plate for facilitating the transfer of heat from coolant within the hollow channel to the thermally conductive plate, and the air-cooled fins being coupled to the thermally conductive plate for facilitating the dissipation of heat transferred to the thermally conductive plate from the coolant within the hollow channel.

2. The cooling system of claim 1, wherein the heat exchange assembly further includes an air moving device disposed within the openable display section of the portable computer, the air moving device being positioned to move air across the air-cooled fins of the heat exchange assembly.

3. The cooling system of claim 1, wherein the air-cooled fins are also coupled to a wall of the openable display section of the portable computer, wherein an auxiliary heat transfer path is defined from the thermally conductive plate through the air-cooled fins to the wall of the openable display section of the portable computer.

4. The cooling system of claim 2, wherein the air moving device is positioned and the air-cooled fins are configured to form a converging plenum within the openable display section of the portable computer to facilitate the movement of air across the air-cooled fins.

5. The cooling system of claim 4, wherein the air moving device comprises a low profile pancake type fan, and wherein the air-cooled fins are defined by a folded fin structure.

6. The cooling system of claim 3, wherein the air-cooled fins are defined by a folded fin structure.

7. The cooling system of claim 3, wherein the hollow channel is coupled to one main surface of the thermally conductive plate by means of a thermal epoxy or solder, and wherein the air-cooled fins are coupled to an opposite main surface of the thermally conductive plate by means of a thermal epoxy or solder.

8. The cooling system of claim 5, wherein the folded fin structure is coupled to the thermally conductive plate, and is coupled to a wall of the openable display section of the portable computer, wherein an auxiliary heat transfer path is formed from the thermally conductive plate through the folded fin structure to the wall of the openable display section of the portable computer.

9. The cooling system of claim 5, wherein the openable display section of the portable computer includes air intake openings near the air moving device and air outlet vents aligned at least partially to channels formed by the air cooling fins to facilitate dissipation of air passing across the air-cooled fins.

10. The cooling system of claim 7, wherein the air-cooled fins are further coupled to the wall of the openable display section of the portable computer by means of a thermal epoxy or solder.

11. An electronic apparatus comprising:
   a base housing having a heat-generating component disposed therein;
   a lid supported on the base housing for movement relative thereto between open and closed positions; and
   a cooling system for dissipating operating heat generated by the heat-generating component, the cooling system including:
      a cold plate assembly having a surface coupled to the heat-generating component;
      a heat exchange assembly disposed within the lid housing, the heat exchange assembly including a hollow channel for carrying coolant;
      a conduit for carrying coolant between the cold plate assembly and the hollow channel within the heat exchange assembly;
      a circulation pump for circulating coolant through the conduit between the cold plate assembly and the heat exchange assembly in a manner causing heat from the heat-generating component to be transferred to the coolant, and carried by the coolant to the heat exchange assembly for dissipation therefrom; and
      wherein the heat exchange assembly includes a thermally conductive plate and air-cooled fins, the hollow channel being coupled to the thermally conductive plate for facilitating the transfer of heat from coolant within the hollow channel to the thermally conductive plate, and the air-cooled fins being coupled to the thermally conductive plate for facilitating the dissipation of heat transferred to the thermally conductive plate from coolant within the hollow channel.

12. The electronic apparatus of claim 11, wherein the electronic apparatus is one of a portable computer or a notebook computer.

13. The electronic apparatus of claim 11, wherein the heat exchange assembly further includes an air moving device disposed within the lid, the air moving device being positioned to move air across the air-cooled fins of the heat exchange assembly.

14. The electronic apparatus of claim 11, wherein the air-cooled fins are also coupled to a wall of the lid, wherein an auxiliary heat transfer path is defined from the thermally conductive plate through the air-cooled fins to the wall of the lid.

15. The electronic apparatus of claim 13, wherein the air moving device is positioned and the air-cooled fins are configured to form a converging plenum within the lid to facilitate the movement of air across the air-cooled fins.

16. The electronic apparatus of claim 13, wherein the air-cooled fins are defined by a folded fin structure, and wherein the folded fin structure is coupled to the thermally conductive plate, and is coupled to a wall of the lid, wherein an auxiliary heat transfer path is formed from the thermally conductive plate through the folded fin structure to the wall of the lid of the electronic apparatus.

17. The electronic apparatus of claim 14, wherein the hollow channel is coupled to one main surface of the thermally conductive plate by means of a thermal epoxy or solder, and wherein the air-cooled fins are coupled to an opposite main surface of the thermally conductive plate by means of a thermal epoxy or solder.

18. A method of fabricating a cooling system for a portable computer which includes a computer body having a heat-generating electronic element therein, and a display section having a screen connected in an openable manner to the computer body, the method comprising:

coupling a cold plate assembly to the heat-generating electronic element;

disposing a heat exchange assembly within the openable display section of the portable computer, the heat exchange assembly including a hollow channel for carrying coolant;

providing a conduit for carrying coolant between the cold plate assembly and the hollow channel within the heat exchange assembly;

disposing a circulation pump in the computer body for circulating coolant through the conduit between the cold plate assembly and the heat exchange assembly in a manner causing heat from the heat-generating electronic element to be transferred to the coolant, and carried by the coolant to the heat exchange assembly for dissipation therefrom; and providing the heat exchange assembly with a thermally conductive plate and air-cooled fins, the hollow channel being coupled to the thermally conductive plate for facilitating the transfer of heat from coolant within the hollow channel to the thermally conductive plate, and the air-cooled fins being coupled to the thermally conductive plate for facilitating the dissipation of heat transferred to the thermally conductive plate from coolant within the hollow channel.

19. The method of claim 18, further comprising providing an air moving device disposed within the openable display section of the portable computer, the air moving device being positioned to move air across the air-cooled fins of the heat exchange assembly.

20. The method of claim 19, further comprising coupling the air-cooled fins to a wall of the display section of the portable computer, wherein an auxiliary heat transfer path is formed from the thermally conductive plate through the air-cooled fins to the wall of the openable display section of the portable computer.

* * * * *